United States Patent [19]
Henry et al.

[11] Patent Number: 5,932,986
[45] Date of Patent: Aug. 3, 1999

[54] PRECISE CONTROL OF THE ROTATIONAL VELOCITY OF BRUSHLESS ALTERNATING CURRENT ELECTRIC SERVO MOTORS

[75] Inventors: William B. Henry, Chelsea; Paul Firehammer, Saline, both of Mich.

[73] Assignee: Whedco, Inc., Ann Arbor, Mich.

[21] Appl. No.: 08/811,681

[22] Filed: Mar. 5, 1997

[51] Int. Cl.⁶ .............................. G05B 19/29; H02P 1/00
[52] U.S. Cl. .................... 318/601; 318/605; 318/616; 318/272
[58] Field of Search .................... 318/560–566, 318/568.18, 599–605, 607, 608, 615–622, 640, 268–272, 652–670

[56] References Cited

U.S. PATENT DOCUMENTS

| | | | |
|---|---|---|---|
| 4,358,726 | 11/1982 | Iwakane et al. | 318/798 |
| 4,457,259 | 7/1984 | Samuels | 118/705 |
| 4,486,693 | 12/1984 | Hamati et al. | 318/561 |
| 4,558,266 | 12/1985 | Sasaki et al. | 318/571 |
| 4,591,774 | 5/1986 | Ferris et al. | 318/696 |
| 5,138,564 | 8/1992 | Jong et al. | 364/571.04 |
| 5,309,075 | 5/1994 | Yokoe et al. | 318/608 |

*Primary Examiner*—Brian Sircus
*Attorney, Agent, or Firm*—James M. Deimen

[57] ABSTRACT

A brushless AC servo motor control and modified motor to minimize the rotational acceleration and deceleration of a semiconductor wafer during processing steps where fluid is applied in a thin coating on the wafer. The control utilizes sine and cosine encoder outputs of single cycle and multiple cycle per revolution to calculate motor shaft position by an inverse tangent calculation of sine and cosine ratios. Resolution of motor shaft position is greatly improved as is rotational velocity control. In response to a prediction of desired shaft position in comparison with actual position the three field currents are adjusted to change the torque applied to the rotor and shaft. In the semiconductor wafer manufacturing application the motor shaft is modified to permit vacuum attachment of the wafer to the disc that rotates with the shaft.

9 Claims, 3 Drawing Sheets

PRECISE CONTROL OF THE ROTATIONAL VELOCITY OF BRUSHLESS ALTERNATING CURRENT ELECTRIC SERVO MOTORS

BACKGROUND OF THE INVENTION

The field of the invention pertains to the control of the rotational velocity of relatively slow speed brushless alternating current electric servo motors. In particular, the invention is directed to eliminating rotational acceleration and deceleration within each rotation as much as possible. The application to which the preferred embodiment described below is directed is one step in the manufacture of circuits on semiconductor wafers, however, the invention is not limited to this application.

One method of etching circuits onto semiconductor wafers incorporates a step during which the wafer is rotated at a constant velocity to distribute a viscous fluid evenly over the surface of the wafer. The quality of the etching process is directly affected by variations in the thickness of the fluid film. The thickness variations are influenced by several parameters including the instantaneous velocity variations in the rotation of the wafer. Typical rotational speeds for this processing step are in the range of 30 to 60 rpm. A subsequent step in processing the wafer requires that the wafer spin at a high rate, in the range of 5,000 to 10,000 rpm.

One method for rotating the wafer utilizes a motorized spindle driven by an electric motor. Of the different types of electric motors available, a brushless alternating current servo motor is preferred. Electric motors with brushes emit carbon and copper particles as well as ozone as a byproduct of their inherent commutation operation. These emissions contaminate the wafer and degrade the semiconductor manufacturing process, rendering brushed motors unsuitable. Of the range of brushless motors, brushless alternating current (AC) servo motors offer a unique combination of small size, high efficiency and low torque ripple.

The choice of a brushless AC motor alone is not sufficient to minimize instantaneous velocity variations to the extent required for accurate semiconductor wafer processing. Previous configurations employing a brushless AC motor and conventional quadrature digital encoder have not proven adequate to provide the degree of velocity consistency required for the process step. Attempts to increase the resolution of conventional encoders have caused bandwidth limitations which render the encoders inoperable at high speed.

SUMMARY OF THE INVENTION

The invention comprises the combination of a brushless AC servo motor with a gun drilled extended shaft, a hollow shaft encoder with single cycle and 1024 cycle per revolution sine and cosine outputs, and a motor position controller and drive for precise instantaneous velocity control of the rotation of a semiconductor wafer.

DISCUSSION OF THE INVENTION

At the relatively low velocities employed during semiconductor wafer processing noted above, small rotational torque variations cause changes in the instantaneous rotational velocity of the rotating components. Because of the inherent manufacturing imperfections in AC brushless servo motors, a motor voltage or current of constant magnitude does not produce a constant rotational torque or constant instantaneous rotational velocity. Thus, a means of measuring and adjusting the velocity during each revolution is required.

In order to accomplish precise low speed instantaneous velocity control of the AC brushless servo motor, the motion controller measures the motor instantaneous rotational velocity and provides the required motor current magnitude and phase to rotate the motor shaft at constant velocity. Precise instantaneous motor rotational velocity measurements require more bandwidth and data than is available from most encoder or resolver transducers.

One method of overcoming the bandwidth and data deficiency is to use an encoder which provides N cycles of sine and cosine data per revolution. The motor position can be determined to a resolution of 1/N rotations by simply counting the cycles of sine or cosine data. The position resolution can be further extended by computing the inverse tangent of the ratio of the instantaneous sine value to the cosine value. By this technique, the resolution of the motor position can be extended one or two orders of magnitude beyond the number of sine, cosine cycles. Since velocity is by definition, rate of change of position, increasing the resolution of the position measurement results in an increase in the resolution of the velocity measurement.

At high rotational velocities, the rotational inertia of the rotating components is sufficient to keep the instantaneous velocity constant. At high velocities, precise knowledge of the instantaneous position and velocity is not required. At such velocities, position and velocity information available from simply counting the N cycles of sine and cosine data, without computing the inverse tangent, is sufficient for precise instantaneous velocity control.

DESCRIPTION OF THE PREFERRED EMBODIMENT

Figure 1:
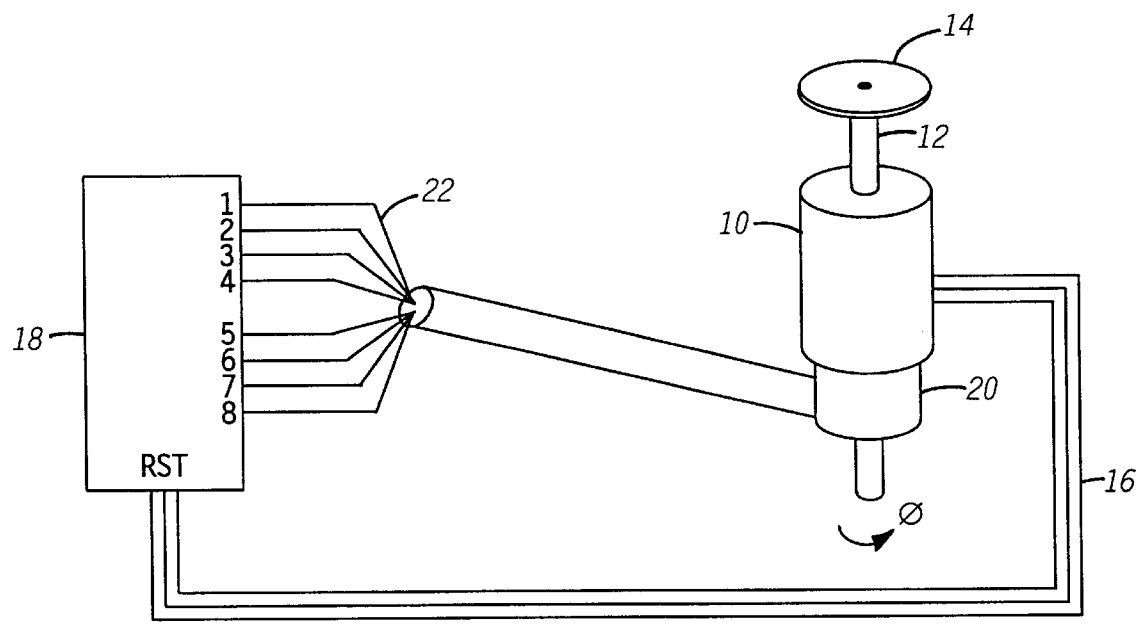
FIG. 1 schematically illustrates the motion controller and AC servo motor assembly.

In FIG. 1 a brushless AC servo motor 10 is vertically mounted with the shaft 12 extending upwardly to support a disc and semiconductor wafer 14 for rotation. The three phase power 16 for the motor 10 is connected to a motion controller 18. A sine, cosine encoder 20 is mounted beneath and to the motor 10 with the motor shaft 12 extending therethrough. The eight sine and cosine outputs 22 of the encoder 20 are inputs to the motion controller 18.

Figure 2:
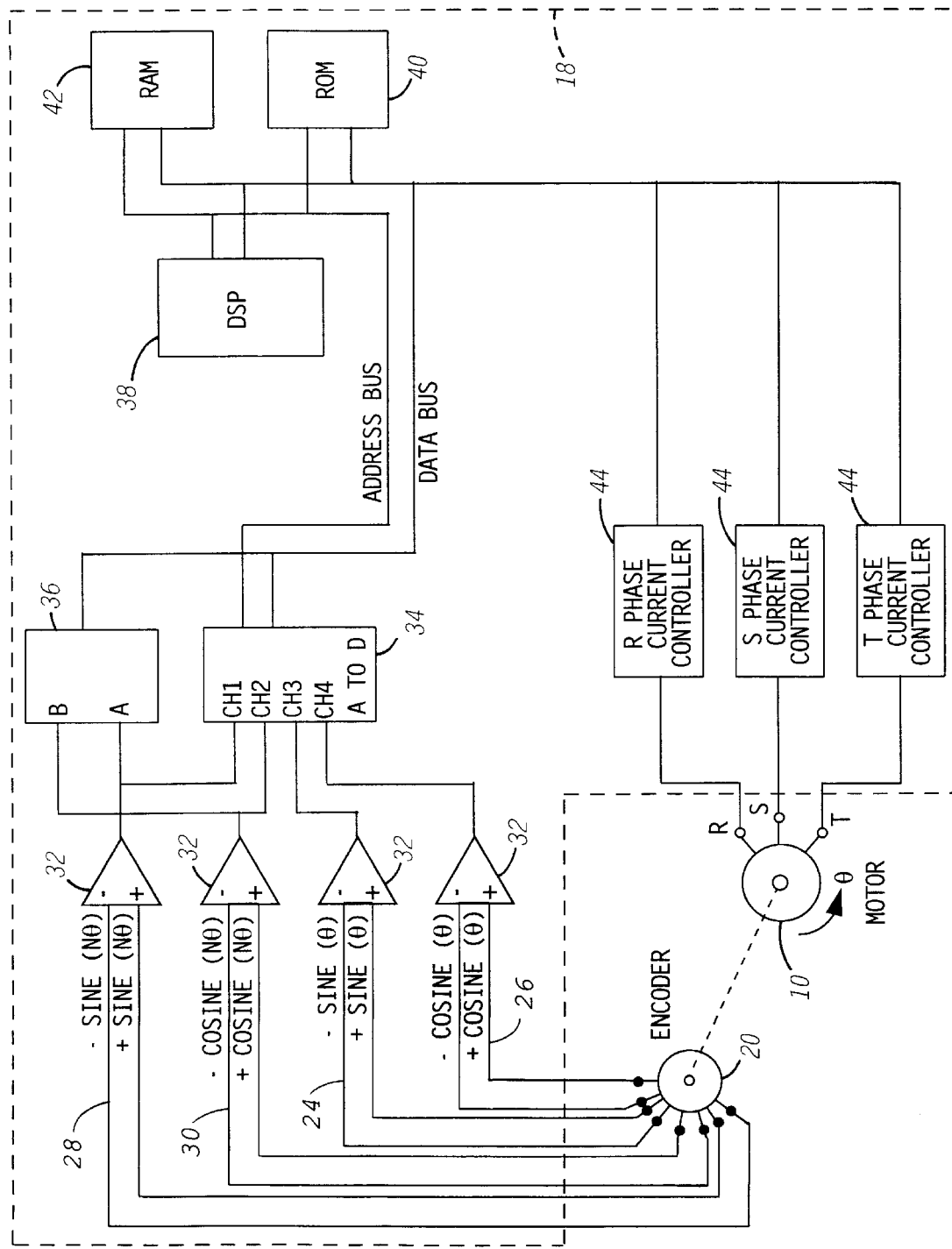
FIG. 2 schematically illustrates the electrical configuration for the motion controller and AC servo motor.

Referring to FIG. 2, the encoder 18 provides outputs proportional to the sine 24 and cosine 26 of the rotational position of the encoder and motor shaft 12 and outputs proportional to the sine 28 and cosine 30 of 1024 times the position of the encoder and motor shaft 12. These outputs are connected to differential amplifiers 32 which in turn are connected to an Analog to Digital converter 34. The differential amplifiers 32 which amplify the sine 28 and cosine 30 of 1024 times the position of the encoder and motor shaft 12 are also connected to a Quadrature Up-Down counter 36 which counts the number of sine and cosine cycles.

As shown in FIG. 2 the Analog to Digital converter 34 and Quadrature counter 36 are connected to a Digital Signal Processor 38 with ROM 40 and random access memory (RAM) 42. The output from the signal processing further described below is supplied to the three current controllers 44 for the R, S and T phases of the motor 10.

Figure 3:
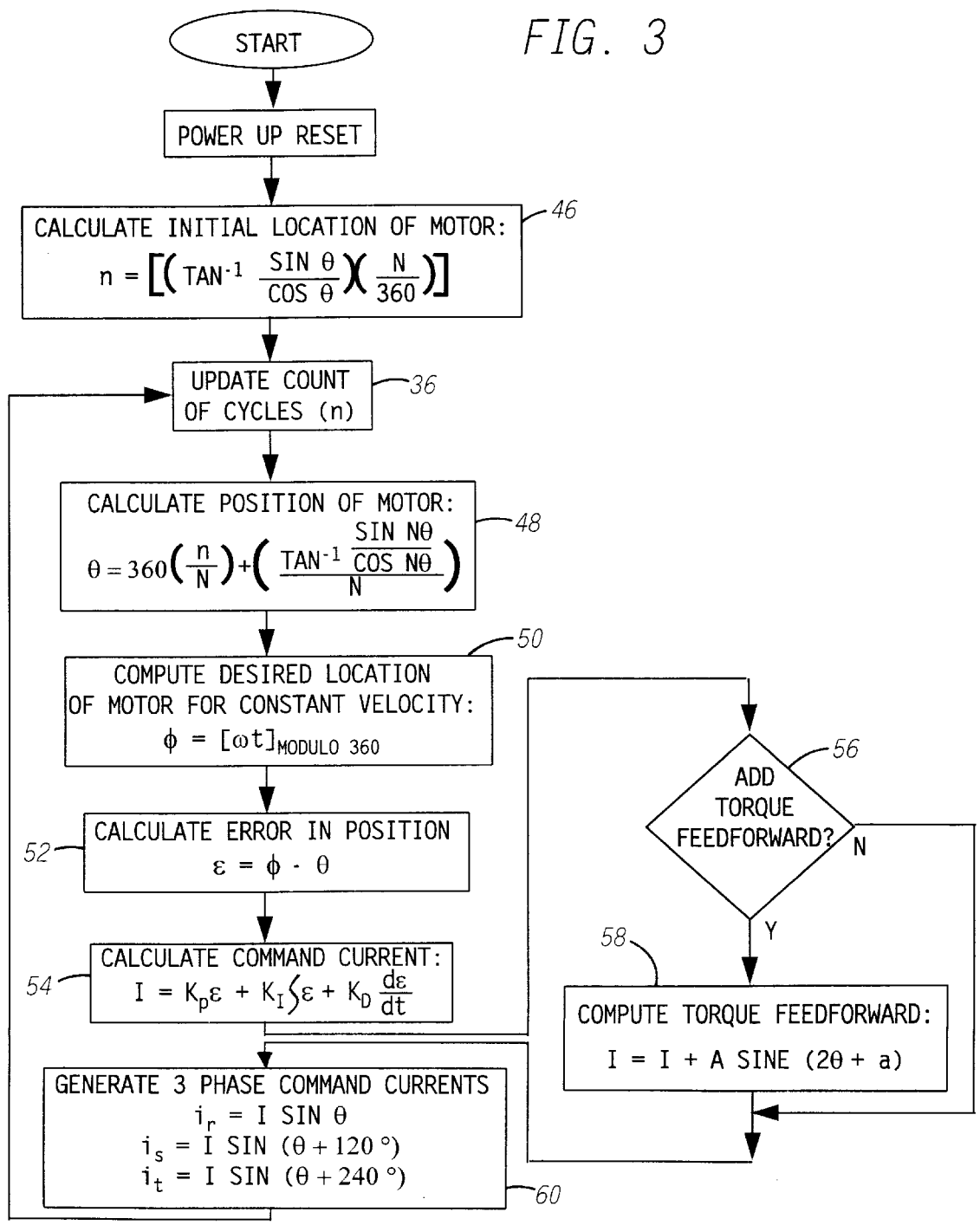
FIG. 3 is a flow diagram of the control program stored in read only memory (ROM)

The Digital Signal Processor 38 operating under control of the program illustrated by the flow diagram of FIG. 3 and stored in ROM 40, calculates the initial position of the motor shaft 12 by computing the inverse tangent of the sine of the encoder shaft position divided by the cosine of the encoder shaft position at block 46. This initial determination of the motor shaft 12 position from the single cycle sine and cosine encoder tracks allows the initial value of the motor current to be correct.

As the motor shaft 12 rotates, the Digital Signal Processor 38 measures the motor shaft 12 position by computing the inverse tangent of the sine of 1024 times the position of the encoder shaft divided by the cosine of 1024 times the position of the encoder shaft at 48 and adds this result to the value stored in the Up-Down counter 36. With this configuration and program the instantaneous position of the encoder shaft and motor shaft 12 is measured each 0.000122 seconds to a resolution of 1/65536 revolution.

The Digital Signal Processor 38 also calculates the desired position of the motor shaft 12 for a constant velocity each 0.000122 seconds to a resolution of 1/65536 revolution at 50 and computes an error term at 52 which is the difference between the motor shaft 12 position required for a constant velocity and the measured motor shaft position. This difference is the input to an algorithm at 54, 56 and 58 which calculates the magnitude of each of three command currents at 60 produced by the motion controller 18 and fed to the motor 10 field windings. These command currents at 44 produce adjusted magnetic fields in the motor which react with the field of the permanent magnet motor rotor on shaft 12 to produce the torque required to rotate the motor at a constant velocity. By this almost continuous correction, any deviations between the actual instantaneous velocity and the desired constant velocity are minimized.

The current controllers 44 may be those disclosed in U.S. patent application Ser. No. 08/645,901, FIG. 2 without the output filter components R10, S10 and T10, and incorporated by reference in this application.

Motors with large inherent torque ripple may require torque ripple feed forward to attain an acceptable level of instantaneous velocity variation. Torque ripple is defined as the variation in torque produced by the motor as a function of the rotor position when the motor is driven by a constant current. One method to compensate for torque ripple is to provide a correcting term to the magnitude of the current vector where the correction is of the form A* sine ((# poles/2* motor shaft position)+a) where A and a are determined empirically for each individual motor. Experience has shown that while this technique provides sufficient improvement to allow motors with high values of torque ripple to be used in this application, it requires determining the constants A and a for each individual motor. Thus, the preferred configuration for practicing the invention utilizes motors with sufficiently low values of torque ripple that this motor by motor empirical technique is not required.

Figure 4:
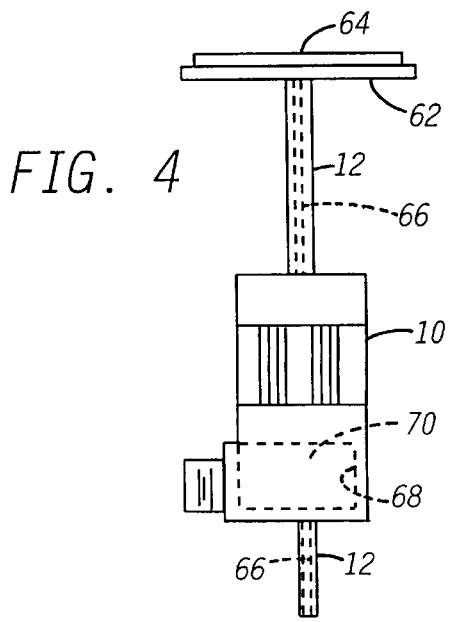
FIG. 4 is a side view of an AC servo motor.

FIG. 4 illustrates a motor 10 modified for the semiconductor wafer manufacturing step discussed above. The motor 10 is mounted vertically as shown with a vacuum disc 62 attached to the upper end of the shaft 12. A semiconductor wafer 64 is drawn by a vacuum into tight attachment to the disc 62. An axial hole 66 is formed in the shaft 12 and extends to the lower end of the shaft to provide a vacuum conduit for the disc 62.

Figure 5:
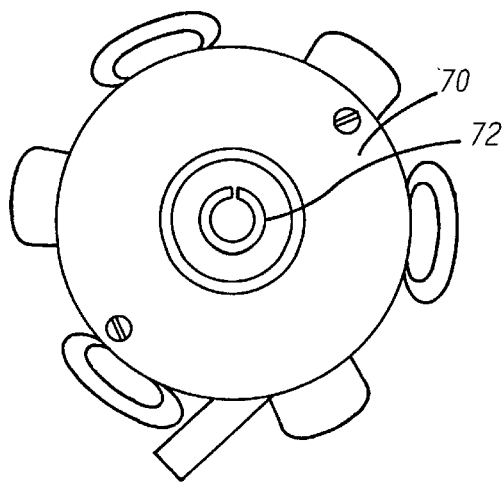
FIG. 5 is an end view of an encoder for the AC servo motor assembly.

The lower end of the motor 10 is formed with a cavity 68 to permit insertion of an encoder 70 as shown in FIG. 5. The encoder 70 is fitted with a split rotatable sleeve 72 and the sleeve is fastened to the shaft 12 upon assembly of the encoder 70 into the cavity 68 of the motor 10. A suitable motor 10 adapted for this application is Model No. R32HSNC-NP-NS-NV-02 available from Pacific Scientific Corporation of Rockford, Ill. and a suitable encoder 70 is Model No. 88-Z833 available from Dynamics Research Corporation, Wilmington, Mass. Although this combination of motor, encoder, program and electric components has been found well suited for the wafer manufacturing process, other motor, encoder, electric components and programming may be substituted and the invention is not limited to the particular components described above.

I claim:

1. In the manufacture of the semiconductor wafers, a step of rotating the wafer at a relatively low velocity while simultaneously vacuum retaining the wafer to a rotating disc and controlling the rotational velocity to minimize, rotational acceleration and deceleration within each rotation by determining the instantaneous rotational position of the shaft, comparing the instantaneous rotational position to a desired rotational position calculated for constant rotational velocity, in response thereto adjusting the applied rotational torque to maintain constant rotational velocity and repeating the control of rotational velocity at specified time intervals.

2. The manufacturing step of claim 1 wherein the rotational velocity is 30 to 60 revolutions per minute.

3. The manufacturing step of claim 1 wherein the specified time intervals are 122 microseconds.

4. The manufacturing step of claim 1 wherein the instantaneous rotational position is determined by counting cycles of sine and cosine data to provide a resolution of 1/N rotations of the shaft and computing the inverse tangent of the ratio of the instantaneous sine value to the cosine value to thereby extend the resolution of shaft position substantially beyond 1/N rotations.

5. The manufacturing step of claim 4 wherein the resolution of the shaft position is at least one order of magnitude beyond the resolution of 1/N rotations of the shaft.

6. A semiconductor wafer manufacturing device comprising a vertically mounted brushless AC servo motor, a hollow shaft in the motor and extending thereabove, vacuum retaining means attached to the shaft above the motor, encoder means engaging the shaft and in electrical communication with means to digitize and means to signal process the output of the encoder, said signal process means programmable to determine the rotational position of the shaft repeatedly within each rotation of the shaft and to compare with a corresponding rotational position calculated for constant velocity, and in response thereto, to adjust the field strength currents of the motor to minimize acceleration and deceleration within each rotation of the shaft and thereby to maintain constant velocity, said motor being connected electrically to the signal process means.

7. The semiconductor wafer manufacturing device of claim 6 wherein the actual rotational position of the shaft is calculated at least once every 122 microseconds and the field strength current adjusted in response thereto.

8. The semiconductor wafer manufacturing device of claim 6 wherein the signal process means determines the instantaneous rotational position of the shaft by counting cycles of sine and cosine data to provide a resolution of 1/N rotations of the shaft and computing the inverse tangent of the ratio of the instantaneous sine value to the cosine value to thereby extend the resolution of shaft position substantially beyond 1/N rotations.

9. The semiconductor wafer manufacturing device of claim 8 wherein the resolution of shaft position is at least one order of magnitude beyond the resolution of 1/N rotations of the shaft.

* * * * *